United States Patent [19]
Steenborg

[11] Patent Number: 5,319,926
[45] Date of Patent: Jun. 14, 1994

[54] THRUSTER FOR SPACECRAFT

[75] Inventor: Manfred Steenborg, Buchenhügel, Fed. Rep. of Germany

[73] Assignee: ERNO Raumfahrttechnik, Bremen, Fed. Rep. of Germany

[21] Appl. No.: 908,123

[22] Filed: Jul. 1, 1992

[30] Foreign Application Priority Data

Jul. 10, 1991 [DE] Fed. Rep. of Germany ....... 4122755

[51] Int. Cl.$^5$ .......................... F03H 1/00; F03H 5/00; F02K 11/00
[52] U.S. Cl. ................................................. 60/203.1
[58] Field of Search ...................... 60/200.1, 202, 203.1, 60/204

[56] References Cited

U.S. PATENT DOCUMENTS

| | | | |
|---|---|---|---|
| 3,359,734 | 12/1967 | Ferrie et al. | 60/203.1 |
| 3,425,223 | 2/1969 | Browning | 60/203.1 |
| 4,577,461 | 3/1986 | Cann | 60/203.1 |
| 4,926,632 | 5/1990 | Smith et al. | 60/203.1 |
| 5,027,596 | 7/1991 | Steenborg | 60/203.1 |

Primary Examiner—6
Assistant Examiner—Louis J. Casaregola
Attorney, Agent, or Firm—Anderson Kill Olick & Oshinsky

[57] ABSTRACT

A thruster is described which is utilized, especially among other applications, for the tracking or orbital correction of a spacecraft, which comprises a housing configured as an anode, an expansion nozzle and a rod-shaped electrically insulated cathode centrally retained therein. The cathode is disposed in a combustion chamber into which propellant or propulsive gases are injected. The tip of the cathode is spaced so as to form a small air gap from the constricted cross-section of the nozzle neck. An electric arc is ignited between the anode and the cathode during the gas flow, from which arc the propellant gases receive additional thermal energy.

1 Claim, 6 Drawing Sheets

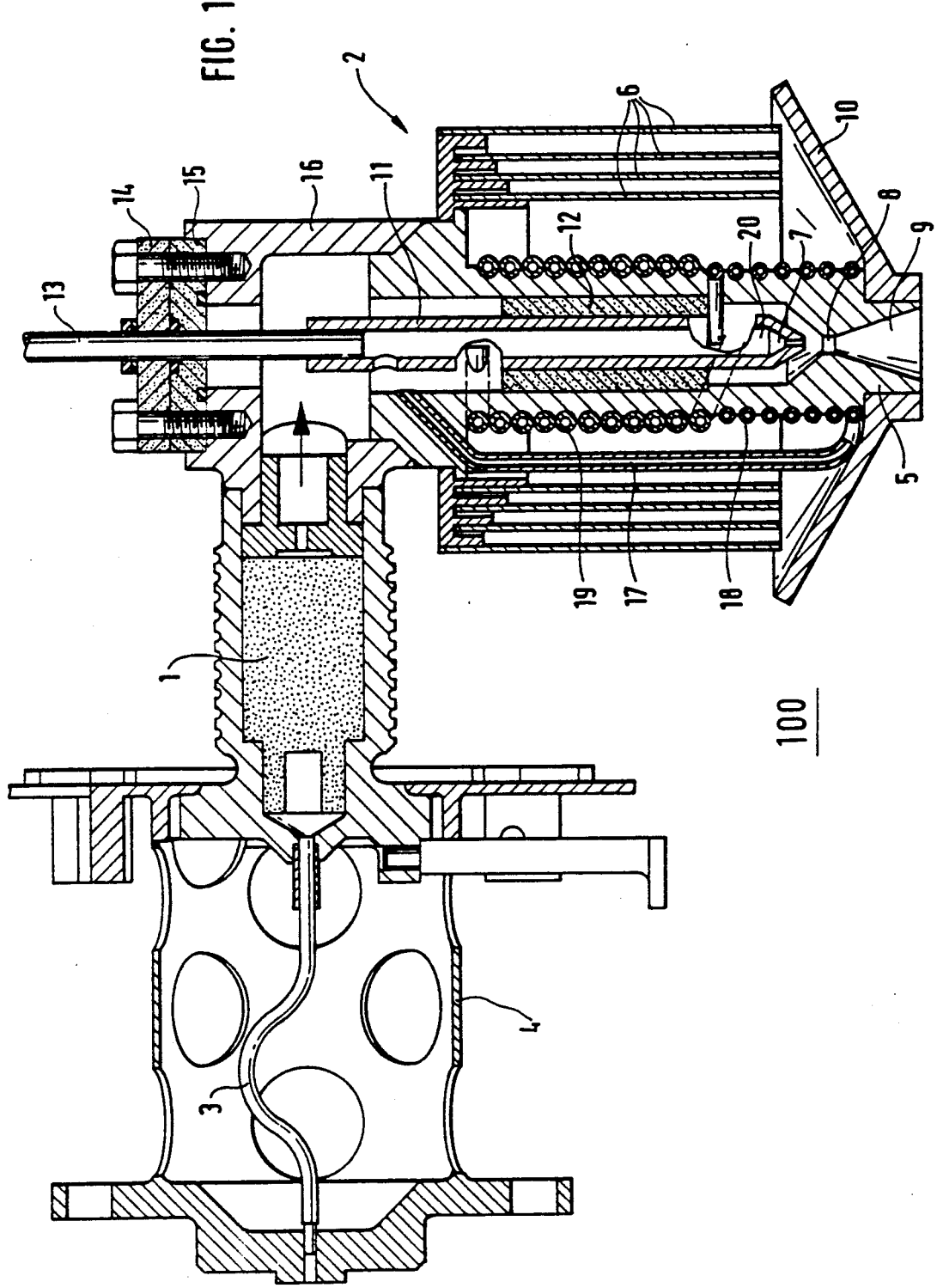

THRUSTER FOR SPACECRAFT

FIELD OF THE INVENTION

The present invention deals with a thruster, especially for use in spacecraft, wherein an electric arc is ignited in a gas flow between a housing which serves as an anode and an expansion nozzle as well as the tip of a cathode which is arranged in same. The cathode is housed so as to be electrically insulated in a first recess of the housing, which is configured as a plenum chamber, with the cathode being positioned with its tip portion spaced by a small air gap upstream of the constricted cross-section of the expansion nozzle and wherein propulsion gases are injected into the plenum chamber.

BACKGROUND OF THE INVENTION

Thrusters for propulsion units which are designated arc jets by the specialized community, have become known through the publication "Cathode Erosion Tests for 30 kW Arcjets" by W.D. Deininger, A. Chopra and K.D. Goodfellow, A/AA 89-2264, among other publications, which was published on the occasion of the 25th Joint Propulsion Conference A/AA/ASME/SAE/ASEE, Monterey, CA, July 10-12, 1989. The propulsion gas, which typically may be ammonia $NH_3$ or a mixture of ammonia, nitrogen $N_2$ and hydrogen gas $H_2$, which is produced by a thermal and/or catalytic decomposition of hydrazine $N_2H_4$, is directed in these prior art thrusters through a bore which is disposed in the side wall of a plenum chamber and into the plenum chamber itself. The gas, which has a temperature on the order of 500°-600° C., upon its entry into the plenum chamber, is heated by an electric arc, which is formed between the anode (positive terminal) and the cathode's (negative terminal), to temperatures of 10°-15,000° C. prior to leaving the expansion nozzle and producing the desired forward thrust or propulsion effect.

The electric arc, which builds up after ignition in the gas flow of the thruster, extends from the anode (positive terminal) to the generally cone-shaped tip portion of the cathode (the negative terminal) through the neck of the nozzle or the constricted region. The electric arc, which exists between the anode and the cathode, transfers the largest portion of its kinetic energy to the rotating propulsion gas in the nozzle's constricted region. The electric arc is formed precisely along the central axis of the constricted region.

The region, in which the electric arc emerges from the inside wall of the expansion nozzle, is highly stressed thermally by wall temperatures which exceed 2000° C. In order to achieve as stable an electric arc as possible, it is desired to provide a rotating flow of the propulsion gases in the nozzle neck or constricted region. A high rotational velocity for the propulsion gas is also an important precondition for a tight gas flow which is produced in the region of the constricted region of the nozzle neck, and because of the high velocity during rotation, for as much heat as possible being transferred from the electric arc to the gas.

In order to obtain a rotating gas stream, the propulsion gas in such thrusters is introduced into the plenum chamber with a tangential flow component, through bores arranged in the side wall of the plenum chamber or in an annularly-shaped insulator, which is provided between the cathode and the anode surrounding the cathode.

SUMMARY OF THE PRESENT INVENTION

The thruster of the present invention is designed in such a manner that the wear of the individual components, especially the cathode, due to thermal stresses, is significantly reduced, thereby improving the useful life of such a thruster or propulsion unit, considerably.

The present invention provides a thruster especially for use in space-craft, wherein an electric arc is ignited in a gas flow between a housing which serves as an anode and an expansion nozzle as well as the tip portion of a cathode which is disposed in the housing. The cathode is housed so as to be electrically insulated in a first recess of the housing which is configured as a plenum chamber as well as being disposed with the tip portion being spaced to form a small air gap upstream of the constricted cross-sectional region of the expansion nozzle and wherein propellant gases are injected into the plenum chamber. The injection elements, which are inset into the wall of plenum chamber are connected to the supply or feed elements for the propellant gases.

The measure of providing separate injection elements instead of injection bores directly in the plenum chamber which consist mostly of tungsten or its alloys or, in the insulator, consisting of pyrolitic boronitride, which is provided for by the present invention, provides many advantages. While bores having randomly small diameters cannot be fabricated in materials such as tungsten, the internal diameters and the shapes of the separate injection elements can be selected in such a manner that the injection velocities are considerably increased.

In addition, the entire gas flow up to the region of the expansion nozzle can be influenced in an advantageous manner by the appropriate shaping of the injection elements. Furthermore, by selecting two injection tubes having different diameters and lengths it can be achieved that only a small quantity of gas is at first injected for igniting the thruster, so as to reduce the erosion at the cathode which is most noticeable during ignition. Chronologically, after this ignition, the entire fuel throughput occurs in accordance with the pressure gradient.

The thruster of the present invention has a simple and an inexpensive design along with having reduced weight characteristics. Further, due to the higher injection velocity through the injection elements which is facilitated by the present invention, good Reynolds Numbers, and favorable possibilities for heat removal from thermally stressed regions, are obtained.

Materials such as rhenium or its alloys may be utilized for the fabrication of the tubularly-shaped injection elements. This practice provides a multitude of shaping possibilities, because such material has good deformation characteristics also at room temperature.

The present invention also provides for the utilization of tubes for the flow of the propellant gases into the thruster chamber so that a light constructional weight is achieved under the particular aspect of using smaller tube diameters. Due to the exposure of smaller cross sections to the pressure, this type of construction permits higher operational temperatures while maintaining material strength. The advantage of the foregoing is a rapid warmup of the thruster and thus a quicker attainment of the desired high specific impulse.

The present invention also provides for nozzle length reduction due to the small nozzle constriction required as the electric arc can transmit sufficient heat to the gas due to the high rotational velocity of the propellant gas in the nozzle constriction and the high gas velocities resulting therefrom. The essential advantage of a nozzle constriction shortened in such a manner lies in the possibility of reducing the electric arc voltage and, herein simultaneously, to lower the risk that the column of the electric arc contacts the wall of the nozzle constriction so as to result in a reduction of the specific impulse of the thruster which is unfavorable.

Furthermore, the injection elements provided in the present invention provide for increased rotation of the propellant gas by the expanded possibilities of influencing the velocity and the direction of the propellant gas beam or flow which enters the plenum chamber. An improved adjoining flow results therefrom which increases the reliability of the thruster in operation.

Finally, it is also possible to dispose an injection element as a spirally-shaped tube in such a manner that it embraces or surrounds the region of the nozzle constriction so that it may act as a heat exchanger. In this manner, a portion of the heat generated by the electric arc is conducted from this region and the resulting more uniform temperature distribution increases the useful life of the highly stressed materials in the region of the nozzle constriction.

Due to the fact that, in another embodiment of the invention, a division of the propellant gas supply can be facilitated in such a manner that a small portion of the gas flow enters into the plenum chamber via a bore in the tip of the cathode, this portion of the gas stream can simultaneously be utilized as the cooling medium for the cathode tip. An advantageous consequence of this feature is that, due to the reduced erosion resulting from the temperature reduction in the region, a high dimensional stability of the cathode tip and an improved longevity of the cathode or of the entire thruster are attained.

Accordingly, it is an object of the present invention to provide a thruster in such a manner that the wear of the individual components, due to thermal stresses is reduced thereby improving the useful life of the thruster.

It is another object of the present invention to provide a thruster having a simple and an inexpensive design along with having reduced weight characteristics.

It is another object of the present invention to provide a thruster having good Reynolds Numbers and favorable possibilities for heat removal from thermally stressed regions.

It is yet another object of the present invention to provide a thruster wherein materials such as rhenium or its alloys may be utilized for fabrication of the injection elements so as to provide for a multitude of shaping possibilities.

It is yet another object of the present invention to provide a thruster having light constructional weight and higher operating temperatures while maintaining material strength so as to further provide a rapid thruster warm-up and a further attainment of the desired high specific impulse.

It is still another object of the present invention to provide a thruster having reduced nozzle length and a reduced electric arc voltage.

It is still another object of the present invention to provide a thruster having increased propellant gas rotation and improved reliability.

It is still another object of the present invention to provide a thruster wherein the heat generated by an electric arc is conducted in the system so as to provide a more uniform temperature distribution so as to increase the useful life of the components in the region of the nozzle constriction.

It is still another object of the present invention to provide a thruster having a cathode wherein the thruster and the cathode have high dimensional stability and improved longevity.

Other objects and advantages of the present invention will be made apparent to those skilled in the art upon the review of the Detailed Description of the Preferred Embodiment taken in conjunction with the Drawings which follow.

DESCRIPTION OF THE DRAWINGS

In the Drawings:

FIG. 1 illustrates the thruster of the present invention in a sectional view.

DETAILED DESCRIPTION OF THE PREFERRED EMBODIMENT

Figure 3:
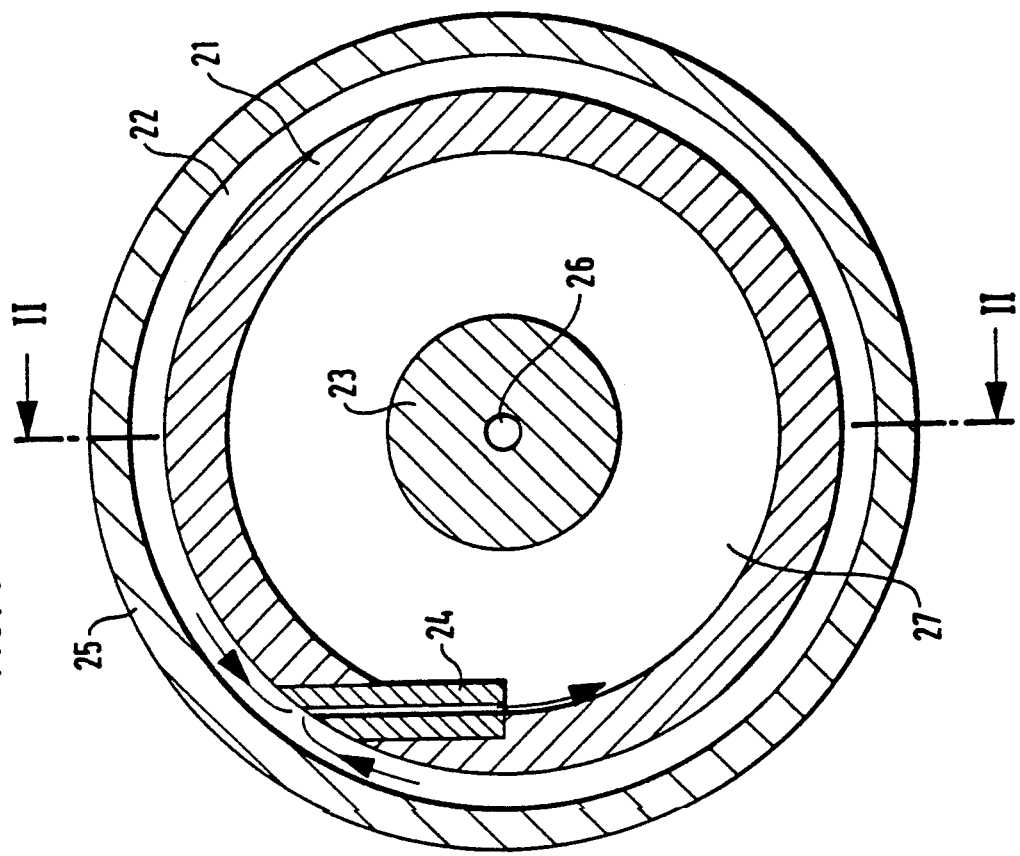
FIGS. 2 and 3 illustrate two sections which are perpendicular with respect to one another through the region of the combustion chamber of the thruster of FIG. 1.

FIG. 1 illustrates the thruster, which is the subject of the present invention and which is denoted generally by the reference numeral 100. The thruster, which is a high performance thruster, may be used, among other applications, for the tracking and attitude correction of spacecraft. The thruster comprises a decomposition chamber 1 where a liquid energy carrier is converted into gaseous components by thermal and/or catalytical decomposition or dissociation. These gases are then supplied as propulsion gases to an electric arc propulsion unit 2, which is typically an arc jet. The liquid energy carrier in the present embodiment is typically hydrazine $N_2H_4$, which is stored in a storage tank (not shown) from which it arrives, through an injection tube 3 which is surrounded by a heat shield 4, into the decomposition chamber 1.

The decomposition chamber 1 contains a porous filling which, as in the case of the preferred embodiment, typically consists of a catalyzer. While hydrazine is utilized, the propellant gases do not necessarily have to consist of dissociated hydrazine, which consists of $NH_3$, $H_2$ and $N_2$. It is equally possible to use inert gases. These utilized gases, however, must not contain oxygen. The propulsion unit 2 consists of a rotationally symmetrical housing 5, which is surrounded by a multilayer external insulation 6. A plenum chamber 7, a constrictor 8 and a nozzle neck following thereon, and an expansion nozzle 9, are provided in a centered arrangement, with the outlet aperture of the expansion nozzle 9 being surrounded by a radiation reflecting surface 10. A rod-shaped electrode or cathode 11 which tapers, in a cone-shaped manner, is disposed in the center of the plenum chamber 7, and is retained by means of a cylindrical insulation insert 12, and is connected by a junction rod 13, with the negative pole of an electrical energy supply unit (not shown). The junction rod 13 is retained by means of two ceramic plates 14 and 15 and an adapter 16 which connects the decomposition chamber 1 to the housing 5.

The gas flow, indicated by arrow A, which emerges from the decomposition chamber 1, arrives through the adapter 16, into the housing 5, from which it can reach the chamber via three paths.

A first partial stream flows through a channel 17 into a first spirally-shaped tubular system 18, which surrounds the housing 5 in the region of the expansion nozzle 9, the constrictor 8 and the tip portion of the cathode 11. A second partial stream flows through an additional spirally-shaped tubular arrangement 19, while a third partial stream flows to the combustion chamber 7 through a central bore 20 located in the cathode 11.

FIGS. 2 to 9 illustrate, in greater detail, the propulsion unit 2 of the thruster for various embodiments. FIGS. 2 to 7 illustrate embodiments wherein spirally-shaped tubular systems 18 and 19 are not utilized.

Figure 2:
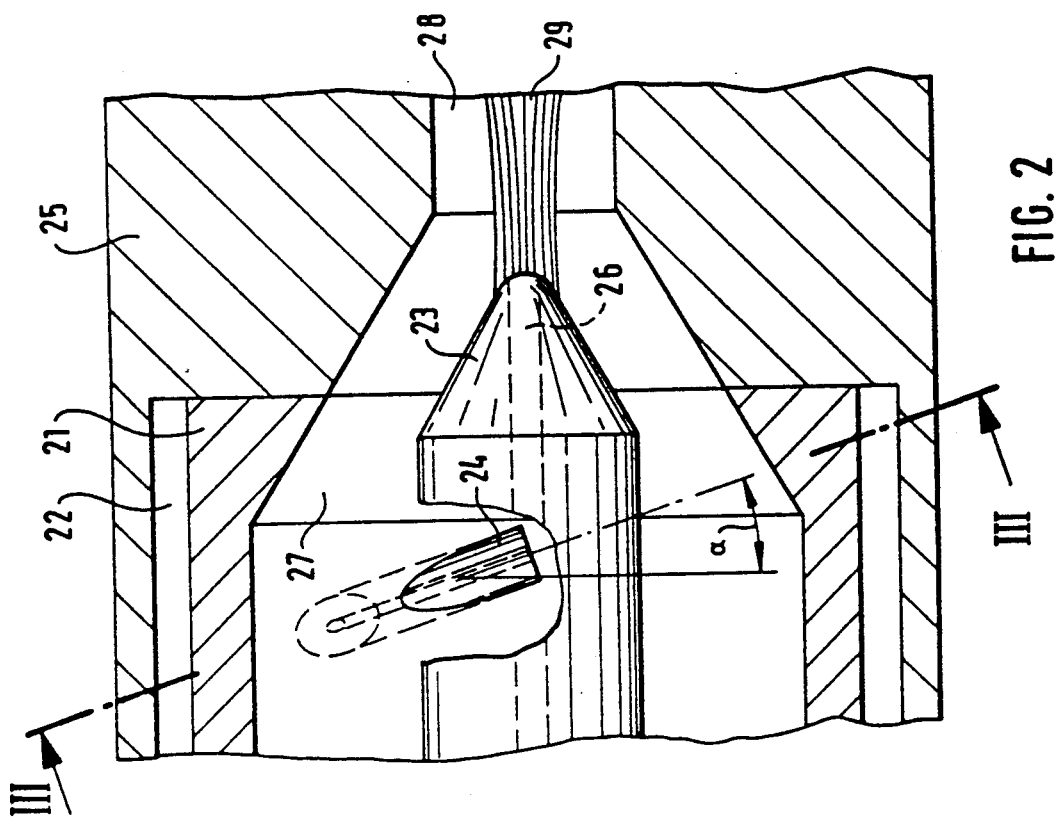

FIGS. 2 and 3 illustrate, in section view, housing or anode 25, wherein instead of the previously described tubular systems, a cavity 22 is formed by a cylindrical insert 21, through which the propellant gas arrives in the region of the tip portion 23 of the cathode. A tubular piece 24, which is typically constructed of Rhenium, is inserted into a bore of the insert 21 in such a manner, that the propulsive or propellant gas, as indicated by the arrows shown in FIG. 3, flow tangentially against the wall surfaces of the combustion chamber 27. At the same time, as can be seen from FIG. 2, the tubular piece 24 is inserted at an angle α with respect to the axis extending transverse to the longitudinal axis of the plenum chamber 27, so that the gas flow is additionally imparted with a movement component in a direction of the constrictor 28.

A portion of the gas flow also enters the plenum chamber 27 through a central bore 26 at the tip portion 23 of the cathode, wherein these propulsive gases directly arrive into an electric arc 29, which is indicated in FIG. 2 by the shaded region, which is ignited between the housing or anode 25 and the tip portion 23 of the cathode. The electric arc extends herein tightly bundled through the constrictor 28 toward the cathode, wherein it emerges out of the inner wall of the expansion nozzle.

Figure 5:
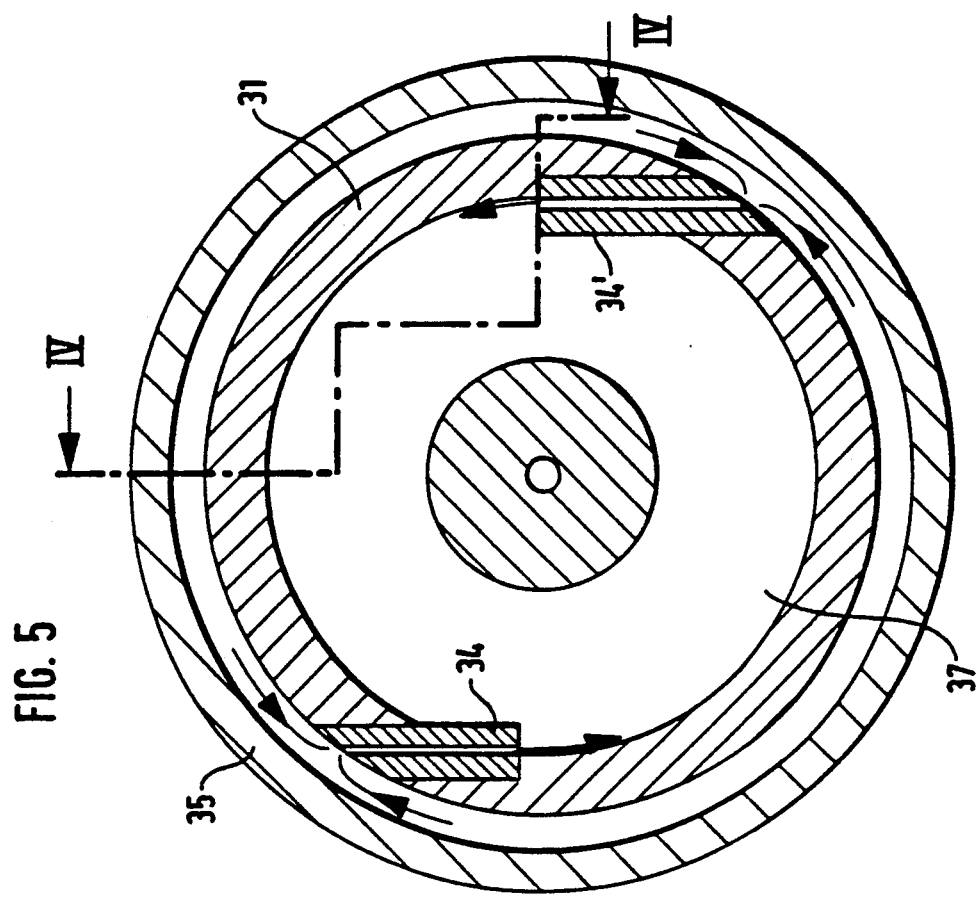
FIGS. 4 to 9 provide sectional illustrations of the region of the plenum chamber or the nozzle neck in various embodiments.
Figure 4:
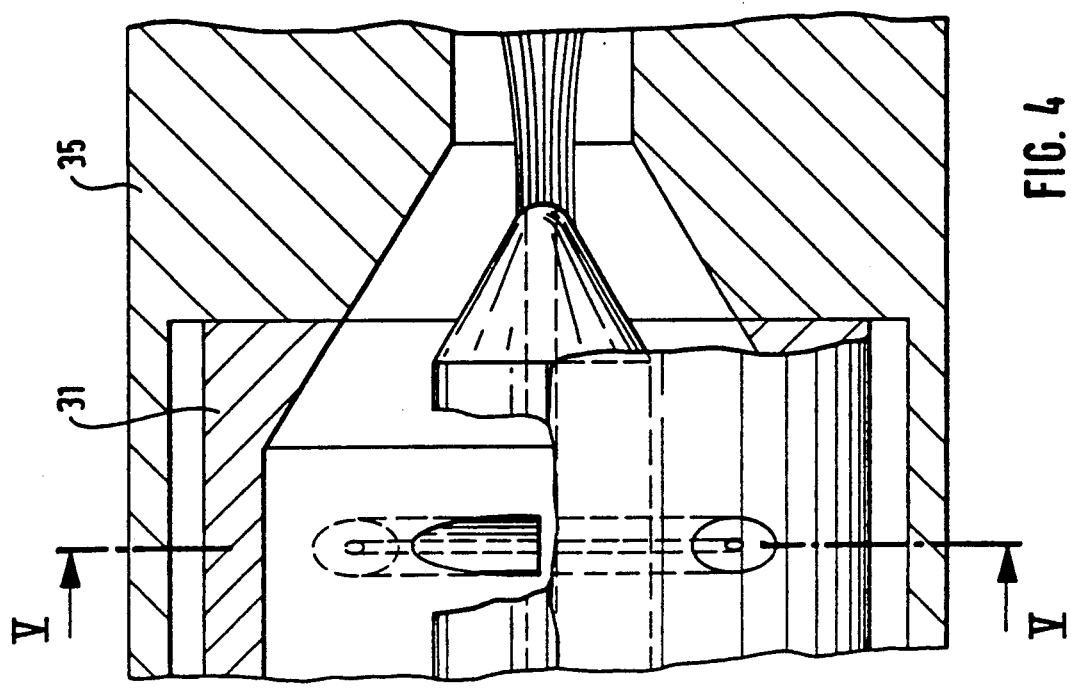

The arrangement illustrated in FIGS. 4 and 5 differ from the previously described embodiment in that two pipe pieces 34 and 34' are welded or soldered into an insert 31 of a housing or anode 35. In this embodiment, the pipe pieces 34 and 34' are also arranged in such a manner that the propellant gas flows tangentially against the internal wall of the plenum chamber 37. By means of the gas flow being divided into two parts there results an improved rotation of the propellant gases. By selecting the diameter and the length of the two tubular pieces 34 and 34' to differ from each other, there results furthermore the possibility to feed only a small quantity of gas for igniting the thruster through the tube with the smaller internal diameter and a smaller length, in order to prevent the erosion which may occur during the course of ignition and, subsequently, to feed the larger gas quantity required for the steady state operation through the longer tube.

Figure 7:
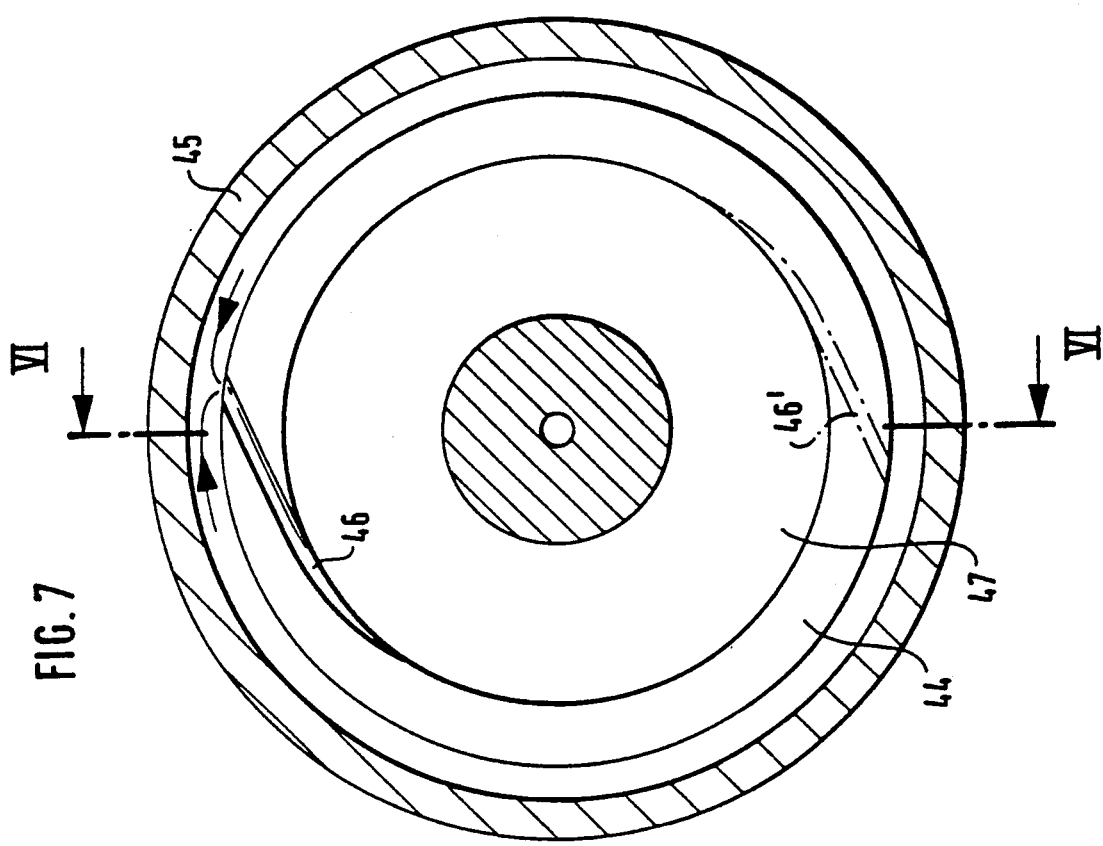
Figure 6:
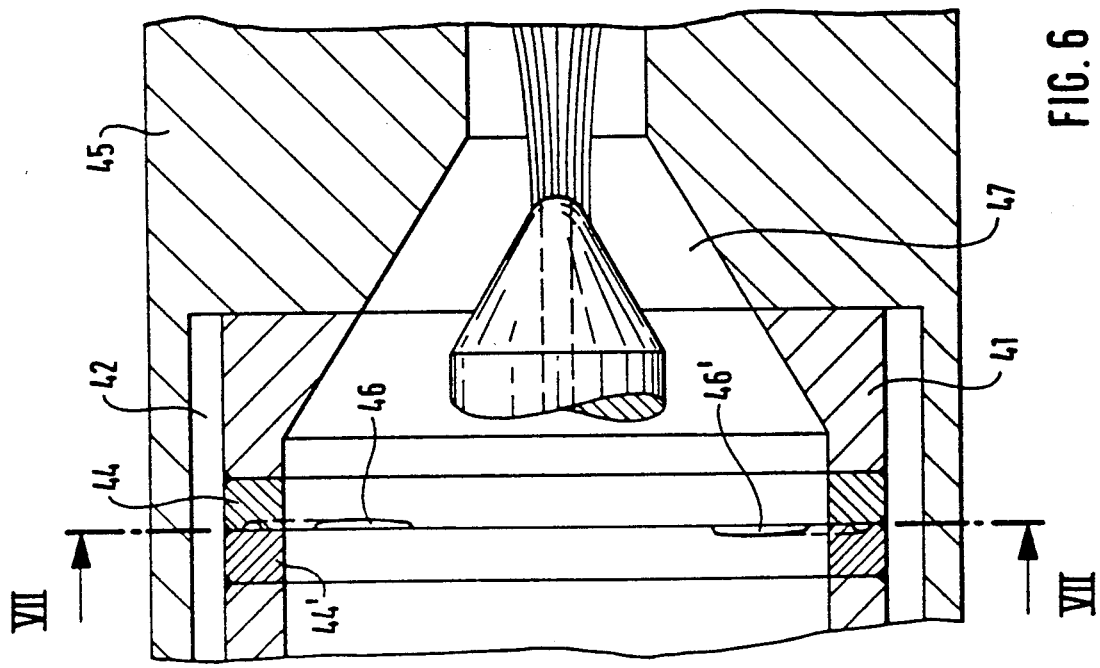
Figure 9:
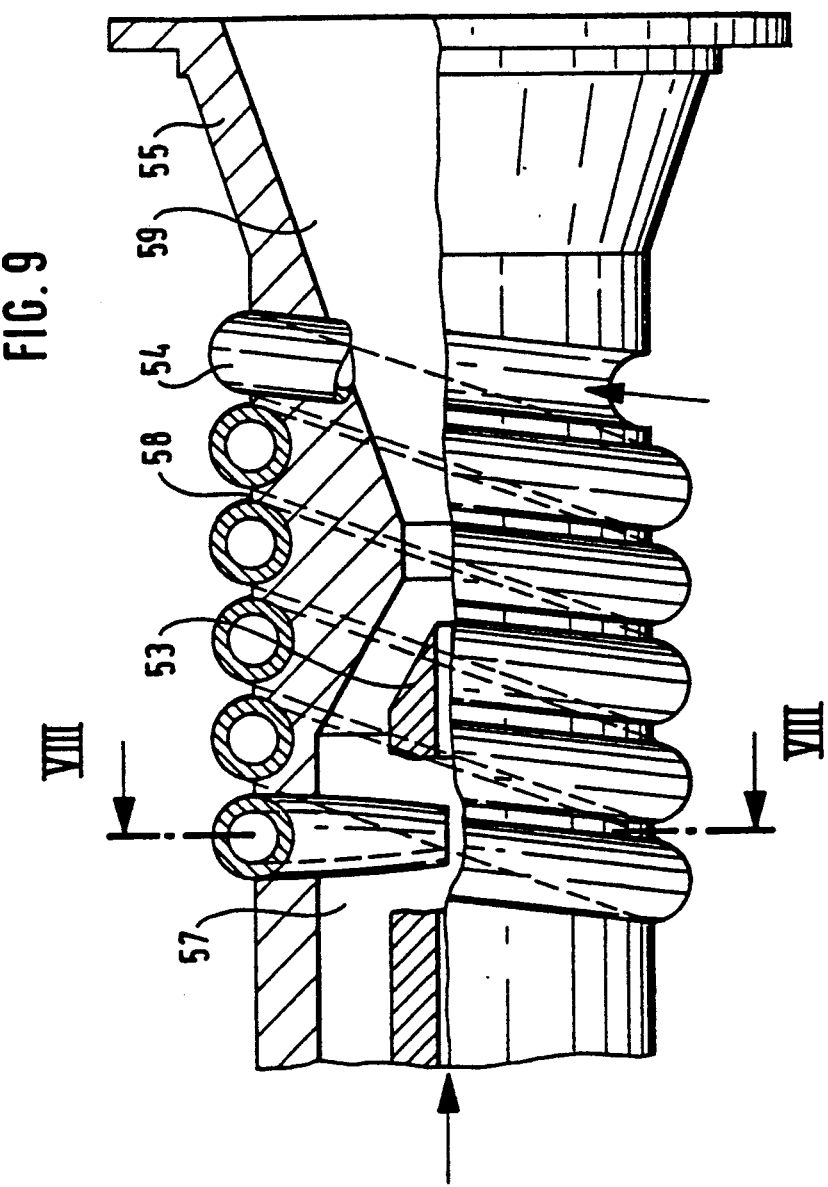

The same effect is achieved in the embodiment illustrated in FIGS. 6 and 7 by arranging two disks 44 and 44' in an insert 41 which is also retained in a housing or anode 45. The disks 44 and 44' are provided with grooves 46 and 46'. The grooves 46 and 46' extend as illustrated in FIG. 7 from the cavity 42 in the plenum chamber 47 and run in such a manner that the entry of the propellant gases into the plenum chamber 47 occurs tangentially with respect to the wall. The grooves 46 and 46' can have circular as well other cross-sections such as rectangular cross-sections, which are formed into the disks 44 and 44' which are further welded together and consist of materials such as molybdenum or tungsten.

In the embodiments shown in FIGS. 2 to 7, only the injection area of the propellant gas feed arrangement consists of a rhenium tube. In the embodiment shown in FIGS. 8 and 9, as in FIG. 1, the entire gas flow into the plenum chamber 57, with the exception of the partial flow directed through the cathode, passes through rhenium tubes. In particular, the tube 54, which is partially embedded into the housing or anode 55 which further embraces spirally the region of the cathode tip 53, the constrictor 58 and the expansion nozzle 59, causes a sustained cooling of this thermally highly loaded thruster component.

Figure 8:
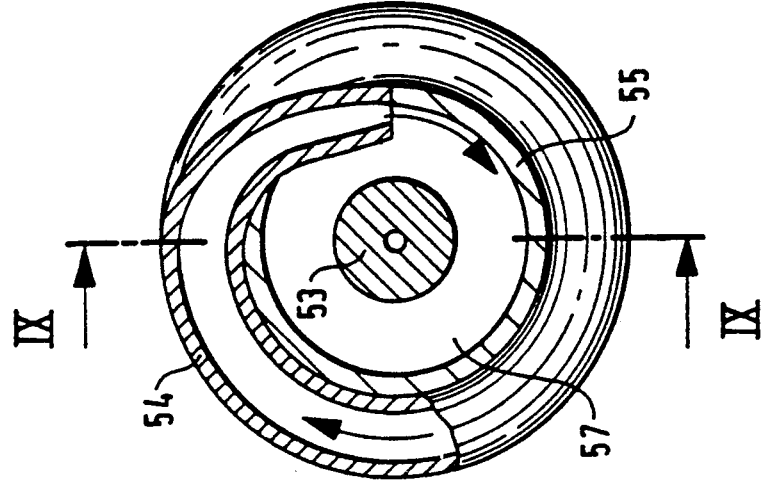

The propulsive gas which emerges from the decomposition chamber at approximately 500°-600° C., and which is a mixture of nitrogen $N_2$, ammonia $NH_3$, and hydrogen $H_2$, is heated in the tube 54 prior to flowing tangentially into the plenum chamber 57 as indicated by the arrows in FIG. 8. A second partial flow of the comparatively cool propulsive gas, which comes from the decomposition chamber, also flows through a central bore in the cathode 53 and into the plenum chamber 57 where it therein cools the tip portion of the cathode to such an extent that erosion thereof is prevented.

As a result of the divided gas flow, the areas having the highest thermal stresses are greatly protected. In addition, because the 500° C. heated propulsive gas supplies heat through the central bore in the tip portion of the cathode from the start, a hot start is provided for the cathode, which reduces the wear at the tip portion of the cathode, considerably.

Figure 10:
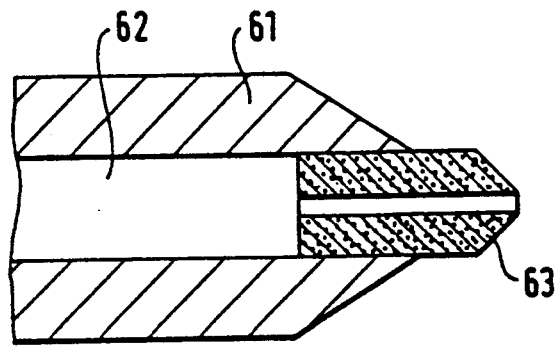
FIGS. 10 to 12 illustrate, in greater detail, sections through various embodiments of cathode tips.
Figure 11:
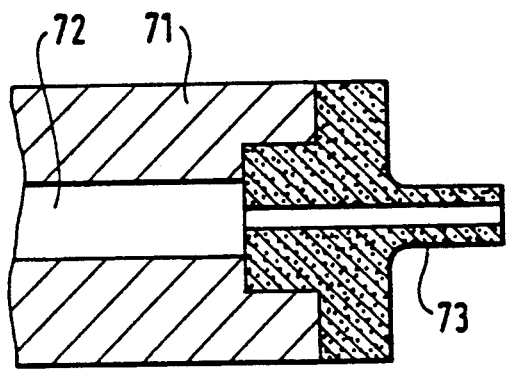
Figure 12:
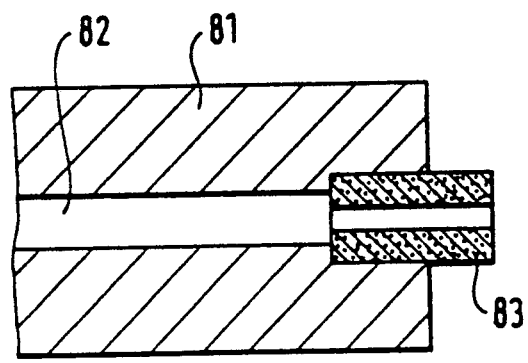

FIGS. 10 to 12 illustrate various embodiments for the tip portion of the cathode, wherein inset members, 63, 73, or 83, are inserted, respectively, as a separate tip into the cathode 61, 71 or 81, respectively. The cathodes 61, 71 and 81 are also provided with central flow channels or bores 62, 72 or 82, respectively. The inset members 63, 73 and 83 are either welded or soldered into their respective cathodes and consist of thoriated tungsten while the cathode typically consists of rhenium or molybdenum or their alloys. The inset members 63, 73 and 83 comprise, respectively, a cylindrical area, which projects from the cathode and assures that the shape of the cathode tip is maintained even if, during the course of longer operational periods, erosion may occur which results in the tips being shortened despite all of the previously enumerated preventive measures.

While the preferred embodiment of the apparatus of the present invention has been described herein, such descriptions are meant to be merely illustrative of the present invention and are not to be construed as limitations thereof. Therefore, the present invention may encompass any and all modifications and/or alternative embodiments the scope of which is limited only by the claims which follow.

I claim:
1. A thruster for a spacecraft, comprising:
   a housing adapted to serve as an anode and including an expansion nozzle, which has a constricted cross section region, and a wall having an inner surface, defining an annular plenum chamber;

a rod member disposed in said annular plenum chamber, adapted to serve as a cathode and having a tip located upstream of said constricted cross section region in a spaced relationship thereto to form an air gap therebetween, through which gap an electric arc is generated upon application of positive and negative electrical potentials to said housing and said rod member, respectively;

means for electrically insulating said rod member from said inner wall surface; and at least one tubular element connected with a source of a propellant gas and inserted into said wall of said housing with an orientation, which provides for injection of a stream of the propellant gas into said plenum chamber tangentially to said inner surface of said wall;

wherein said thruster further comprises a pair of tubular elements wherein said tubular elements are inserted into said wall of said combustion chamber so as to be offset against each other by 180°, and further wherein said pair of tubular elements includes a shorter tubular element and a longer tubular element wherein the lengths of said tubular elements are unequal and further wherein said shorter tubular element has a diameter which is smaller than a diameter of said longer tubular element.

* * * * *